United States Patent
Green et al.

(10) Patent No.: US 8,820,214 B2
(45) Date of Patent: Sep. 2, 2014

(54) SYSTEM AND METHOD FOR PRODUCING FOAMED MILK FROM POWDER

(75) Inventors: Charles Bradley Green, Dacula, GA (US); Xinhua Chen, Atlanta, GA (US); Carter Crittenden Bennett, Lilburn, GA (US)

(73) Assignee: The Coca-Cola Company, Atlanta, GA (US)

( * ) Notice: Subject to any disclaimer, the term of this patent is extended or adjusted under 35 U.S.C. 154(b) by 1055 days.

(21) Appl. No.: 11/619,696

(22) Filed: Jan. 4, 2007

(65) Prior Publication Data
US 2008/0166463 A1  Jul. 10, 2008

(51) Int. Cl.
| | |
|---|---|
| A47J 31/32 | (2006.01) |
| A23F 5/40 | (2006.01) |
| A47J 31/44 | (2006.01) |
| A47J 31/40 | (2006.01) |
| B01F 1/00 | (2006.01) |
| A47J 43/12 | (2006.01) |
| B01F 3/04 | (2006.01) |

(52) U.S. Cl.
CPC .......... *A47J 31/401* (2013.01); *A47J 31/4485* (2013.01); *A47J 43/127* (2013.01); *B01F 2003/04673* (2013.01); *B01F 1/0011* (2013.01); *B01F 3/04808* (2013.01); *B01F 3/04453* (2013.01)
USPC .............. 99/287; 99/323.1; 261/84; 426/433; 222/145.6; 222/235; 366/165.3; 366/196

(58) Field of Classification Search
USPC ........... 99/287, 323.1, 323.3; 366/146, 177.1, 366/279, 164.6, 165.3, 196, 604, 343; 222/1, 129.1, 148, 190, 145.6, 235; 426/433; 261/84
See application file for complete search history.

(56) References Cited

U.S. PATENT DOCUMENTS

| | | | |
|---|---|---|---|
| 4,194,843 A |   | 3/1980 | Martin |
| 4,357,861 A | * | 11/1982 | Di Girolamo ................. 99/323.3 |
| 4,676,401 A | * | 6/1987 | Fox et al. ............................ 222/1 |
| 4,903,585 A | * | 2/1990 | Wimmers et al. ................ 99/275 |
| 4,967,647 A | * | 11/1990 | King ................................ 99/280 |
| 5,197,373 A | * | 3/1993 | De Jong .......................... 99/283 |
| 5,423,245 A |   | 6/1995 | Midden |
| 5,582,644 A | * | 12/1996 | Gaddis et al. ................. 118/303 |
| 5,759,064 A |   | 6/1998 | Sugiyama |

(Continued)

FOREIGN PATENT DOCUMENTS

| | | |
|---|---|---|
| DE | 10354708 A1 | 6/2005 |
| EP | 0709131 | 5/1996 |

(Continued)

OTHER PUBLICATIONS

First Office Action of Chinese National Phase Application No. 2007800489514, dated Oct. 13, 2010 (with English Translation).

*Primary Examiner* — Reginald L Alexander
(74) *Attorney, Agent, or Firm* — Sutherland Asbill & Brennan LLP

(57) ABSTRACT

A foamed beverage system for creating foamed beverages from a powder, a liquid, and air. The foamed beverage system may include a mixing chamber having a mixing zone and a pressurized zone. An impeller is positioned between the mixing zone and the pressurized zone. The powder and the liquid are added to the mixing chamber and the air is entrained within the mixture of the powder and the liquid within the pressurized zone.

18 Claims, 1 Drawing Sheet

(56) References Cited

U.S. PATENT DOCUMENTS

| | | | |
|---|---|---|---|
| 6,085,637 A * | 7/2000 | Fukushima | 99/279 |
| 6,698,625 B2 | 3/2004 | Ufheil et al. | |
| 6,713,110 B2 | 3/2004 | Imboden et al. | |
| 6,729,753 B2 * | 5/2004 | Artman et al. | 366/164.6 |
| 6,977,091 B2 | 12/2005 | Carhuff et al. | |
| 7,013,933 B2 | 3/2006 | Sher et al. | |
| 7,021,206 B2 | 4/2006 | Eckenhausen et al. | |
| 7,059,498 B2 | 6/2006 | Ufheil et al. | |
| 7,464,835 B2 * | 12/2008 | Coronado et al. | 222/145.6 |
| 2003/0232115 A1 | 12/2003 | Eckenhausen et al. | |
| 2004/0149136 A1 | 8/2004 | Halle et al. | |
| 2005/0079265 A1 | 4/2005 | Ufheil et al. | |
| 2005/0118319 A1 | 6/2005 | Green et al. | |
| 2005/0238768 A1 | 10/2005 | Sher et al. | |
| 2005/0258192 A1 | 11/2005 | Matthews et al. | |
| 2007/0251396 A1 * | 11/2007 | Stoter et al. | 99/287 |
| 2008/0233264 A1 * | 9/2008 | Doglioni Majer | 426/594 |

FOREIGN PATENT DOCUMENTS

| | | |
|---|---|---|
| JP | 2003275102 | 9/2003 |
| JP | 2004-295470 | 10/2004 |
| WO | 2005/080199 | 9/2005 |

* cited by examiner

SYSTEM AND METHOD FOR PRODUCING FOAMED MILK FROM POWDER

TECHNICAL FIELD

The present application relates generally a beverage dispenser system and more particularly relates to dispenser systems and methods for producing highly foamed milk from milk powder and the like.

BACKGROUND OF THE INVENTION

Hot beverages such a cappuccinos and lattés are becoming increasingly popular. In addition to traditional coffee outlets and restaurants, retail outlets from fast food restaurants to convenient stores are providing these and other types hot beverages to their customers. Likewise, various types of vending machines and office dispensers are available. Consumers often desire freshly made foam milk in their hot beverage. The foamed milk generally is of higher quality if it is made fresh for each customer.

Generally described, foamed milk may be produced from steam, milk, and air. Foamed milk also can be made from milk powder by combining the powder with hot water and air. The use of milk powder often is preferred given its longer shelf life and ease of use. The milk powder, the water, and the air, however, need to be sufficiently mixed. Insufficient mixing may result in some of the powder not being converted to foam and possibly an off taste.

There is a desire, therefore, for a foamed milk dispenser that can produce foamed milk from milk powder in an efficient, high quality, and high-speed manner to consumers in individual servings or otherwise. The foamed milk dispenser preferably should be easy to use, easy to maintain, and be competitive in terms of costs.

SUMMARY OF THE INVENTION

The present application thus describes a foamed beverage system for creating foamed beverages from a powder, a liquid, and air. The foamed beverage system may include a mixing chamber having a mixing zone and a pressurized zone. An impeller is positioned between the mixing zone and the pressurized zone. The powder and the liquid are added to the mixing chamber and the air is entrained within the mixture of the powder and the liquid within the pressurized zone.

The pressurized zone may be pressurized to about five (5) to about fifteen (15) pounds per square inch (about 0.34 to about one (1) bar). The mixing chamber may include a liquid inlet and a powder inlet positioned about the mixing zone and an air inlet positioned about the pressurized zone. The pressurized zone may include a tapered wall. The foamed beverage system further may include an expansion orifice positioned adjacent to the pressurized zone and an expansion nozzle adjacent to the expansion orifice.

The present application further describes a method of mixing a powder, a liquid and air to make a foamed beverage. The method may include the steps of mixing the powder and the liquid to form a powder and liquid mixture, pressurizing the powder and liquid mixture, entraining air into the powder and liquid mixture to make a entrained mixture, and forcing the entrained mixture through an expansion orifice to make the foamed milk.

The pressurizing step may include creating a pressurized area via an impeller. The impeller may rotate at about 50 to about 500 revolutions per minute. The forcing the entrained mixture step may include creating a Venturi effect via the expansion orifice. The method further may include the step of pressurizing the air.

The present application further describes a foamed beverage system. The foamed beverage system may include a liquid system for providing water, a powder system for providing powder, an air system for providing air, and a chamber for mixing the powder, the liquid, and the air. The chamber may include an impeller and an expansion orifice.

The pressurized zone may be pressurized to about five (5) to about fifteen (15) pounds per square inch (about 0.34 to about one (1) bar). The chamber may include a mixing zone and a pressurized zone with the impeller positioned in between. The mixing zone may include a liquid inlet and a powder inlet. The pressurized zone may include an air inlet and a tapered wall leading to the expansion orifice. The chamber may include an expansion nozzle adjacent to the expansion orifice. The air system may include an air pump so as to pressurize the air.

These and other features of the present application will become apparent to one or ordinary skill in the art upon review of the following detailed description when taken in conjunction with the several drawings and the appended claims.

DETAILED DESCRIPTION

Figure 1:
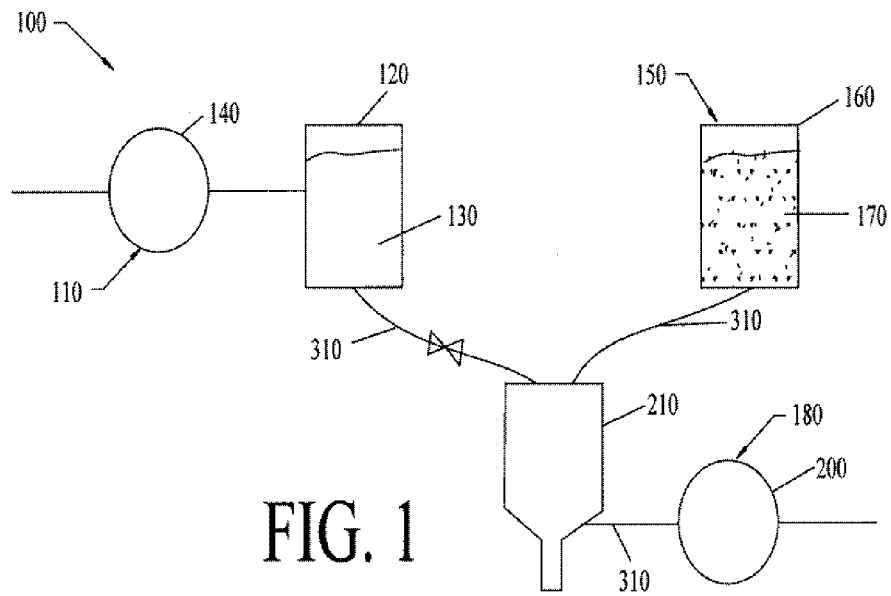
FIG. 1 is a schematic view of the foamed milk system as is described herein.
Figure 2:
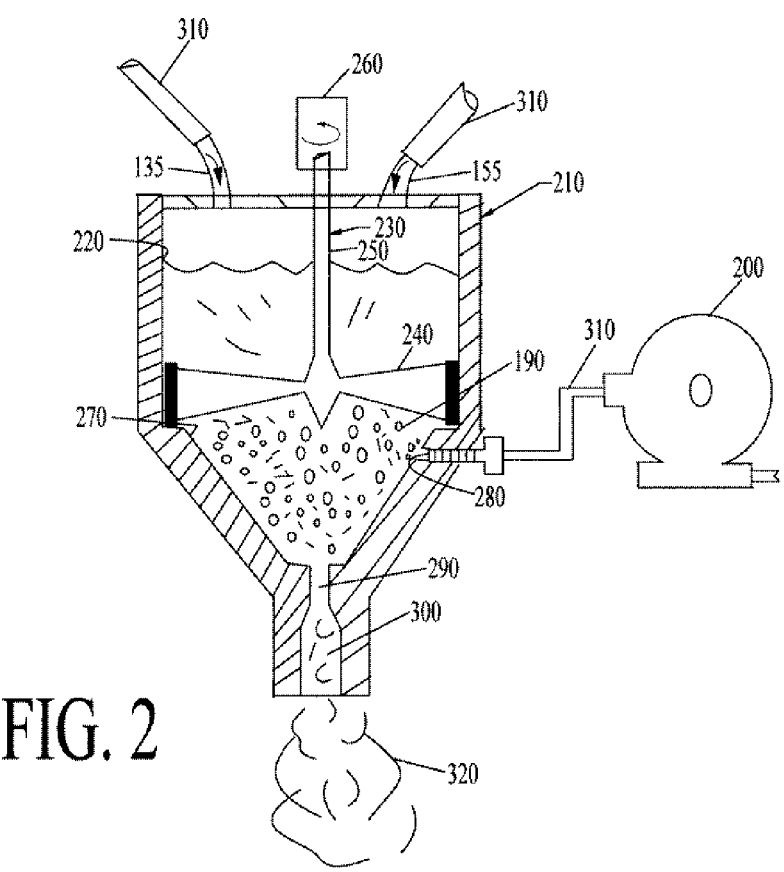
FIG. 2 is a side cross-sectional view of the mixing nozzle of the foamed milk system of FIG. 1.

Referring now to the drawings in which like numerals indicate like elements throughout the several views, FIGS. 1 and 2 show a foamed milk system 100 as is described herein. The foamed milk system 100 may include a hot water system 110. The hot water system 110 may include a water reservoir 120 with a volume of hot water 130 therein. The water reservoir 120 may be heated via conventional means. The hot water reservoir 120 may be fed via a pump 140 or other types of conventional means. Although the hot water reservoir 120 is shown, any method of producing hot water may be used herein.

The foamed milk system 100 may include a milk powder system 150. The milk powder system 150 may include a milk powder hopper 160 with an amount of milk powder 170 positioned therein. Powdered milk is typically made by spray drying nonfat skim milk. Pressurized milk is first concentrated in an evaporator to about fifty percent (50%) milk solids. The resulting concentrated milk is sprayed into a heated chamber where the water almost instantly evaporates, leaving behind fine particles of powdered milk solids. Alternatively, the milk can be dried by drum drying. Milk is applied as a thin film to the surface of a heated drum, and the dried milk solids are then scraped off with a knife. Yet another process is the use of freeze drying. Freeze drying has the advantage of preserving many nutrients in milk compared to drum drying. Although the use of the milk powder 170 is described herein, any type of powdered or granular substance may be used. For example, chocolate, tea, soy and other substances may be used herein.

The milk powder 170 may be fed from the hopper 160 via an auger drive or via similar types of transfer methods. The milk powder 170 also may be feed via gravity or in combination with a transport device and gravity.

The foamed milk system 100 further may include a pressurized air system 180. The pressurized air system 180 may provide pressurized air 190 via an air pump 200 as will be described in more detail below. The pressurized air may be between about two (2) to about forty (40) psi (about 0.14 to about 2.8 bar) depending upon the desired flow rate. Any desired pressure or flow rate may be used herein. The air pump 200 may be of conventional design.

The foamed milk system 100 further includes a mixing chamber 210. The mixing chamber 210 may be made out of conventional types of substantially non-corrosive materials. The mixing chamber 210 may have an upper mixing zone 220. The upper mixing zone 220 receives a supply of the hot water 130 from the hot water system 110 via a water inlet 135 and the milk powder 170 from the milk powder system 150 via a milk powder inlet 155.

An impeller 230 is positioned about the bottom of the upper mixing zone 220. The impeller 230 may be a conventional rotating device with a number of blades 240 attached to a shaft 250. Likewise, by the use of the term "impeller", we refer to any type of rotating structure. An impeller motor 260 may drive the impeller 230. The impeller motor 260 may be any type of conventional drive device so as to rotate the shaft 250. The impeller 230 may rotate at about fifty (50) to about 500 revolutions per minute or so. Any speed may be used herein. The distance between the blades 240 and the wall of the mixing chamber 210 preferably is minimized so as to maintain a pressure differential therethrough.

The mixing chamber 210 further includes a lower pressurized zone 270. The lower pressurized zone 270 may have an internal pressure of about five (5) to about fifteen (15) pounds per square inch (about 0.34 to about one (1) bar) or so. Any desired pressure may be used herein. The lower pressurized zone 270 decreases in diameter as compared to the upper mixing zone 220. For example, if the upper mixing zone 220 has a diameter of about two (2) to about four (4) inches (about 50 to about 100 millimeters) or so, the lower pressurized zone may start with a similar diameter and then taper to about 0.8 to about one (1) inches (about 20 to about 25 millimeters) or so. Any dimensions may be used herein. The lower pressurized zone 270 also has an air inlet 280 in communication with the pressurized air system 180 for the insertion of the pressurized air 190.

Positioned beneath the lower pressurized zone 170 may be an expansion orifice 290. Based upon the dimensions described above, the expansion orifice 290 may have a diameter of about 0.2 to about 0.8 inches (about five (5) to about twenty (20) millimeters) or so. Any dimensions may be used herein. The pressure of the mixture passing therethrough will drop across the expansion orifice 290 so as to promote the foaming of the milk. The expansion orifice 290 then leads to an expansion nozzle 300 of increasing diameter.

The hot water system 110, the milk powder system 150, the pressurized air system 180, and the mixing chamber 210 may be connected by a number of lines 310. The lines 310 may be made out of rubber, silicon, stainless steel, other types metals, plastics, or other types of substantially non-corrosive materials. The materials used preferably are food grade. One or more of the lines 310 may be disposable.

In use, the hot water 130 from the hot water system 110 and the milk powder 170 from the milk powder system 150 are mixed within the upper mixing zone 220 of the mixing chamber 210. The hot water 130 and the milk powder 170 are mixed together with the aid of the impeller 230 to form a product stream. The hot water 130 and the milk powder 170 within the product stream continue mixing as they pass through the impeller 230 into the lower pressurized zone 270.

The pressurized air 190 from the pressurized air system 180 is injected into the lower pressurized zone 270 via the air inlet 280. As described above, the use of the impeller 230 creates pressure within the lower pressurized zone 270 such that the pressurized air 190 becomes entrained into the resultant product stream as the pressurized air passes through the air inlet 280. The tapered of the lower pressurized zone 270 leading to the expansion orifice 290 also increases the speed of the product stream and creates a Venturi effect therethrough. Specifically, lower pressure behind the impeller 230 pulls more of the product stream towards the blades 240 with increasing speed. The resultant mixture is then expanded through the orifice 290 so as to create a foamed milk product 320.

Through the use of the lower pressurized zone 270, the impeller 230, and the expansion orifice 290, the pressurized air is thoroughly mixed and entrained within the product stream so as to create a higher quality foamed milk product 320. The foamed milk system 100 as a whole is more resistant to plugging as the impeller 230 drives the product stream through the mixing chamber 210 rather than simply relying on a gravity feed.

It should be apparent that the foregoing only relates to the preferred embodiments of the present application and that numerous changes and modification may be made herein by one of ordinary skill in the art without departing from the general spirit and scope of the invention as defined by the following claims and the equivalents thereof.

We claim:

1. A foamed beverage system for creating foamed beverage from a powder, a liquid, and pressurized air from an air system, comprising:
    a mixing chamber;
    the mixing chamber comprising a mixing zone and a pressurized zone, the mixing zone defined within an upper portion of the mixing chamber and the pressurized zone defined within a lower portion the mixing chamber, the upper portion of the mixing chamber located above the lower portion of the mixing chamber; and
    a rotating impeller positioned between the mixing zone and the pressurized zone, the impeller comprising a shaft extending vertically through the mixing zone and a plurality of blades extending horizontally from the shaft, the blades positioned between the upper and lower portions of the mixing chamber, segregating the mixing zone and the pressurized zone;
    an air inlet in direct communication with the pressurized zone, wherein the air inlet is configured to provide the pressurized air to the pressurized zone;
    wherein the powder and the liquid are added to the mixing zone of the mixing chamber; and
    wherein the pressurized air from the air system is entrained within the mixture of the powder and the liquid within the pressurized zone.

2. The foamed beverage system of claim 1, wherein the pressurized zone comprises about five (5) to about fifteen (15) pounds per square inch (about 0.34 to about one (1) bar).

3. The foamed beverage system of claim 1, wherein the mixing chamber comprises a liquid inlet and a powder inlet positioned about the mixing zone.

4. The foamed beverage system of claim 1, wherein the pressurized zone comprises a tapered wall.

5. The foamed beverage system of claim 1, further comprising an expansion orifice positioned adjacent to the pressurized zone.

6. The foamed beverage system of claim 5, further comprising an expansion nozzle adjacent to the expansion orifice.

7. A foamed beverage system, comprising:
a liquid system for providing liquid;
a powder system for providing powder;
an air system for providing pressurized air;
a chamber for mixing the liquid, the powder, and the pressurized air;
the chamber comprising an upper mixing zone, a lower pressurized zone, a rotating impeller, and an expansion orifice, the upper mixing zone located above the lower pressurized zone; and
an air inlet in direct communication with the pressurized zone, wherein the air inlet is configured to provide the pressurized air from the air system to the pressurized zone,
wherein the rotating impeller comprises a vertically extending shaft and a plurality of horizontally extending blades, the horizontally extending blades segregating the upper mixing zone and the lower pressurized zone of the chamber.

8. The foamed beverage system of claim 7, wherein the chamber comprises a mixing zone and a pressurized zone with the impeller positioned in between.

9. The foamed beverage system of claim 8, wherein the pressurized zone comprises about five (5) to about fifteen (15) pounds per square inch (about 0.34 to about one (1) bar).

10. The foamed beverage system of claim 8, wherein the mixing zone comprises a liquid inlet and a powder inlet.

11. The foamed beverage system of claim 8, wherein the pressurized zone comprises a tapered wall leading to the expansion orifice.

12. The foamed beverage system of claim 7, wherein the chamber comprises an expansion nozzle adjacent to the expansion orifice.

13. The foamed beverage system of claim 7, wherein the air system comprises an air pump so as to pressurize the air.

14. A method of mixing a powder, a liquid, and pressurized air from an air system to make a foamed beverage, comprising:
mixing the powder and the liquid to form a powder and liquid mixture in a mixing zone within an upper portion of a mixing chamber;
pressurizing the powder and liquid mixture in a pressurized zone within a lower portion of a mixing chamber, the lower portion of the mixing chamber located below the upper portion of the mixing chamber;
entraining pressurized air from the air system into the powder and liquid mixture in the pressurized zone by way of an air inlet in direct communication with the pressurized zone that is configured to provide the pressurized air to the pressurized zone to make an entrained mixture; and
forcing the entrained mixture through an expansion orifice to make the foamed beverage.

15. The method of claim 14, wherein the pressurizing step comprises creating a pressurized area via an impeller.

16. The method of claim 15, wherein the impeller rotates at about 50 to about 500 revolutions per minute.

17. The method of claim 14, wherein the forcing the entrained mixture step comprises creating a Venturi effect via the expansion orifice.

18. The method of claim 14, further comprising the step of pressurizing the air.

\* \* \* \* \*